United States Patent [19]

Gonnello

[11] 4,228,609
[45] Oct. 21, 1980

[54] ICE FISHING DEVICE

[76] Inventor: Lawrence J. Gonnello, 27 Lake Dr., Belchertown, Mass. 01007

[21] Appl. No.: 50,556

[22] Filed: Jun. 21, 1979

[51] Int. Cl.³ .............................................. A01K 91/06
[52] U.S. Cl. ........................................................ 43/16
[58] Field of Search ............................ 43/4, 15, 16, 17

[56] References Cited

U.S. PATENT DOCUMENTS

| | | | |
|---|---|---|---|
| 2,144,175 | 1/1939 | Zonn | 43/15 |
| 2,693,046 | 11/1954 | Langeuin | 43/17 |
| 2,936,541 | 5/1960 | Stanford | 43/17 |
| 2,955,374 | 10/1960 | Matzo | 43/16 |
| 3,645,029 | 2/1972 | Roemer | 43/17 |
| 4,121,367 | 10/1978 | Gonnello | 43/16 |

Primary Examiner—Nicholas P. Godici
Attorney, Agent, or Firm—Ross, Ross & Flavin

[57] ABSTRACT

A device for use in fishing through the ice including means for paying out a line without such appreciable force being required as would scare off a fish which starts to nibble at the line and for suddenly bringing pay out to an abrupt halt so that continued nibbling will cause the line and the other equipment supported by a reel support rod extended through the ice to rotate transversely to that reel support rod to the point in its arc whereat the line and other supported equipment is suddenly jerked upwardly in a fish-snaring movement, allowing the catching of the fish on the line, the device including an actuating handle which also serves as a signal to be simultaneously raised upwardly into operative position.

5 Claims, 8 Drawing Figures

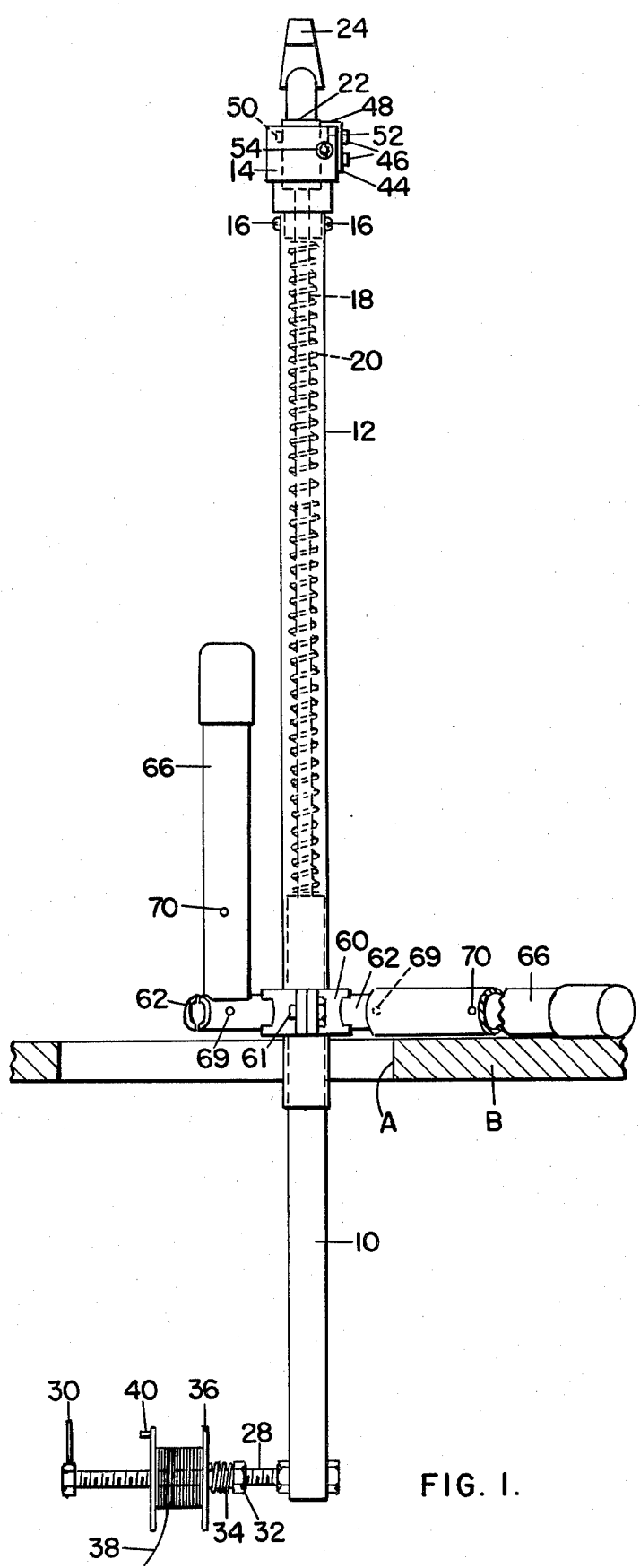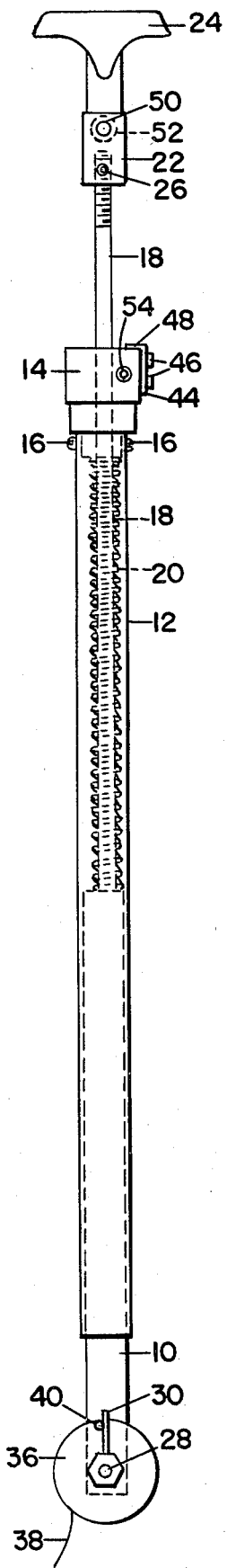

ICE FISHING DEVICE

This invention relates to a device for ice fishing and has for a primary object to provide a device of this general character wherein a fish line reel is suspended through an ice hole and below the water surface and from which reel a line may be paid out through the nibbling of a fish to the point where continued pay out is brought to a sudden and abrupt halt with a sudden jerking of the line vertically upwardly, hopefully catching the fish therewith, with the actuating handle of the device simultaneously signalling the fact upwardly of the ice for the obvious purpose of notifying the fisherman of the possibility of a fish having been caught.

My prior patent, U.S. Pat. No. 4,121,367 of Oct. 24, 1978, discloses ice fishing equipment of this general type. However, it had the disadvantage that the means for setting the device was located adjacent the lower end thereof so as to be disposed below the ice and in the water, making it difficult to see and to set.

Herein, the means for setting the device is disposed adjacent the upper end thereof, where it can be easily set and viewed by the fisherman, with a handle means being incorporated for easy operation, the handle also serving the dual role of acting as a signal when the device is released.

Means is also provided for adjusting the stroke, pressure and sensitivity of the device to meet various fishing requirements.

The device can also serve as a water depth finder, provision being made for free spinning of the reel for the purpose of allowing the descent of a weighted line without triggering the device.

In the drawings:

FIG. 1 is a side elevational view of the ice fishing device showing same in its operative position supported through a hole in the ice, the handle member and reel being shown in their set positions;

FIG. 2 is a side elevational view of the FIG. 1 components showing same in their released positions with the tripod support and ice omitted;

Figure 3:
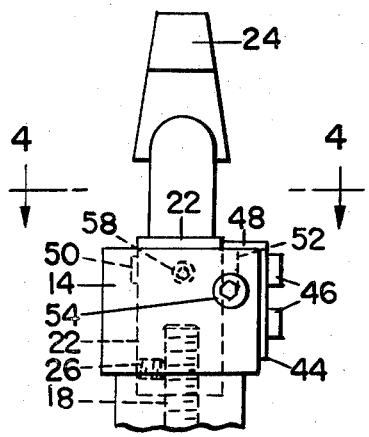
FIG. 3 is an enlarged, fragmentary, side elevational view of the handle and lock means in their set positions.
Figure 4:
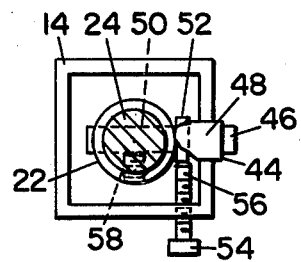
FIG. 4 is a sectional view on line 4—4 of FIG. 3.
Figure 5:
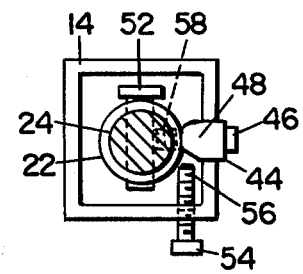
FIG. 5 is a sectional view similar to FIG. 4, showing the handle and lock means in their released positions.

Referring to the drawings, the ice fishing device according to the invention includes a tubular reel support member 10 sleeved within an outer tube 12 and extending downwardly through the open lower end of the tube, the upper end of the tube having a cap member 14 fixed thereto as by screws 16, the cap member having an open upper end.

A rod 18 fixed to the upper end of reel support member 10 extends centrally upwardly within outer tube 12 and through a provided opening in cap member 14.

Rod 18 has a spring 20 sleeved thereon, the spring being fixed to the upper end of reel support member 10 and to the lower end of cap member 14.

A cylindrical coupling member 22 is threadedly engaged with the upper end of rod 18 and has a handle 24 fixed to its upper end. A set screw 26 is threaded in coupling member 22 and has an inner end bearing on the peripherey of rod 18, thereby to lock the coupling member and rod in desired positions of adjustment relative to each other, for purposes to appear.

Projecting outwardly from the lower end of reel support member 10 and perpendicular thereto is a reel guide 28, the inboard end of which guide may be threadedly engaged in a suitable threaded opening adjacent the lower end of reel support member 10, and the outboard end of which guide may be provided with a stop 30 fixed thereto and extending vertically upwardly therefrom.

Along the guide an adjusting nut 32 is threadedly engaged and may be adjusted in inboard and outboard directions so as to drive a spring 34 sleeved upon the guide in a more compressed state (when the nut is adjusted in outboard direction) and a more relaxed state (when the nut is adjusted in inboard direction).

A reel 36 is so configured as to allow a central opening therethrough to ride upon the threads of the guide so as to be movable therealong as a fishing line 38 contained on the reel is wound upon the reel or paid out therefrom.

A stop 40 projects horizontally outwardly from the outboard side of the reel and is adapted to be brought into confrontation with the stop 30, as will appear.

Figure 6:
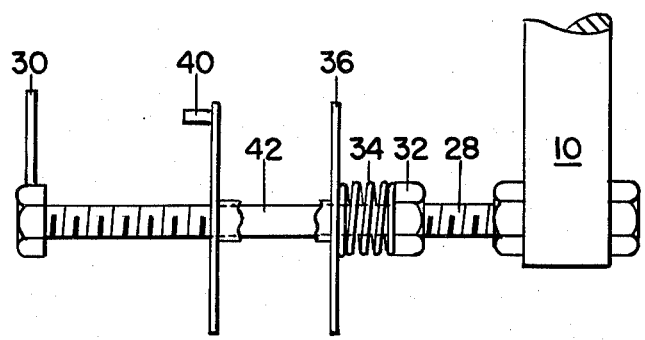
FIG. 6 is an enlarged, fragmentary side elevational view of the reel and guide rod, with portions of the reel broken away for clarity.

As best seen in FIG. 6, a central sector 42 of reel guide 28 is unthreaded whereby reel 36 will be free spinning when located at that sector so that a weighted line can be lowered without lateral reel movement when it is desired to use the device to determine water depth.

The releasable lock means for setting the device includes a bracket 44 fixed to a side wall of cap member 14 as by screws 46 and having a finger-like abutment 48 which rests on the top wall of the cap member and extends horizontally inwardly to overlie a portion of the open top of the cap member.

A locking pin 50 extends horizontally through a provided opening adjacent the upper end of coupling member 22 and has a head 52 which is disposed adjacent the periphery of the coupling member.

To set the device, handle 24 is grasped and rotated while pushing downwardly to bring head 52 of pin 50 under abutment 48 of bracket 44.

A limit screw 54 is threaded in a side wall of cap member 14 below the upper end thereof and has an inner end 56 adapted to contact the periphery of head 52 of pin 50. The positioning of the inner end 56 of the limit screw will determine how much of the head 52 is positioned below abutment finger 48, thus adjusting the sensitivity of the setting means, as will appear.

A further adjustment of the sensitivity is effected by a set screw 58 threaded in coupling member 22 and bearing on pin 50, the set screw locking the pin in positions of adjustment relative to the coupling member so that the position of the head 52 of the pin below the abutment member may be varied.

To support the device relative to the ice, a tripod like assembly may be adjustably secured to reel support member 10 and includes an annular collar 60 sleeved upon the support member and clamped thereto as by a locking bolt 61 at any desired position along the length thereof so as to allow the extension of the member 10 through a hole A in the ice B to any desired depth.

Projecting radially outwardly from collar 60 in equispaced arrangement is a trio of legs 62, each in the form of a hollow tubular member fixed to the collar as by a bolt 64 or other suitable means.

Telescopically engaged with each leg 62 so as to be receivable over the outboard free end thereof is a leg extension 66.

In each instance, leg 62 and its respective leg extension 66 are interconnected by a spring 68 connected to the leg by a pin 69 and to the leg extension by a pin 70.

Figure 7:
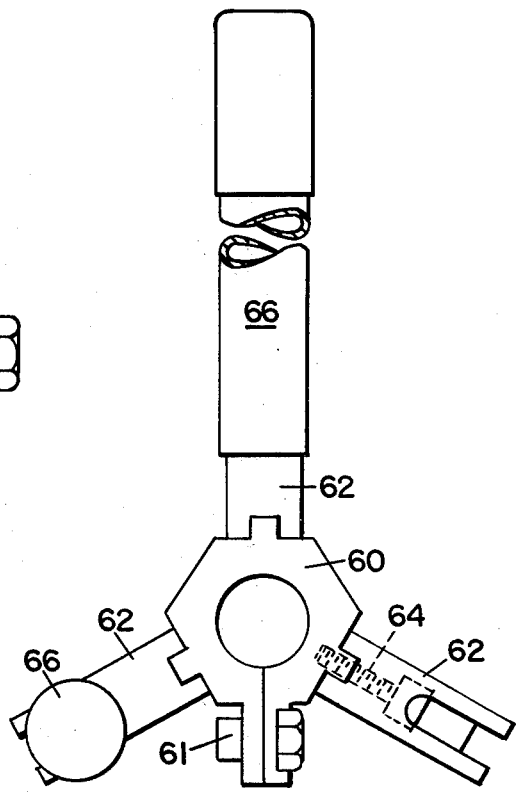
FIG. 7 is a plan view of the ring collar and legs and extensions of the tripod.
Figure 8:
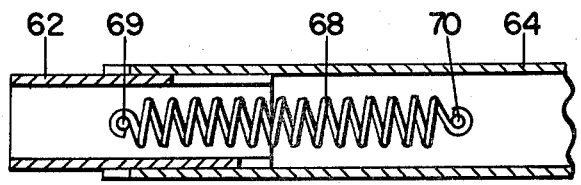
FIG. 8 is an enlarged fragmentary, sectional view of one of the legs of the tripod and its respective extension.

When it is desired to bring the leg extensions into storage positions, each is withdrawn from its telescoping position with a respective leg and is brought into a right angular position relative thereto so as to sit upon the outer wall of its leg in a vertical position in which position it will be extendable in a position roughly parallel to reel support member 10, as shown at the left in FIGS. 1 and 7.

After the device has been set as indicated above, with the head 52 of lock pin 50 disposed below abutment 48, as fish line 38 is paid out to accommodate to the demands of a nibbling fish, reel 36 is caused to move in outboard direction as it also rotates upon guide 28 until such moment when stop 40 on the reel is brought into confrontation with stop 30 of the guide causing a cessation of further pay out of line by the reel so that, if a fish is nibbling at the hook, the taut line will then allow only a sidewise rotative movement of the guide and its supported components about the main axis of reel support member 10.

Such sidewise rotative movement of the guide and reel sets up a concomitant rotative movement of reel support member 10, rod 18, coupling member 22 and handle 24 to move the head 52 out of its trapped position below abutment 48 to release the device, whereupon the handle, coupling member, rod and reel support are driven upwardly under the force of spring 20, imparting a sudden upward jerk upon reel 36 and of course the locked taut line 38 so as hopefully to hook the fish.

The raised position of handle 24 acts as a signal to the fisherman that the device has been released, thereby obviating the necessity for a flag or other signal.

Movement of the handle 24 upwardly or downwardly relative to rod 18 serves to increase or decrease the pull on the spring 20, to adjust the strike and pressure of the device.

The embodiments of the invention in which an exclusive property or privilege is claimed are defined as follows:

1. In a fishing device for ice fishing, the combination of:

a vertically disposed reel support tube for extension into an ice hole, an adjustable bridging means for resting upon the ice surface and bridging the ice hole and supporting the upper portion of the reel support tube upwardly of the ice and the lower portion of the reel support tube downwardly of the ice, an outer tube sleeving the reel support tube and extending upwardly therefrom above the ice and having an open topped cap thereon, a combination handle and signal means operatively connected to the reel support tube, the combination handle and signal means being movable between a lower set position and an upper released position relative to the outer tube sleeving the reel support tube spring means within the outer tube and extending between and fixed to the reel support tube and the cap, an abutment on the cap, a stop on the handle selectively engageable with the abutment, a guide projecting radially outwardly of the reel support tube at the lower end thereof, a line carrying reel rotatably mounted upon the guide, spring means on the guide and bearing on the reel for moving the reel along the guide in an outboard direction as the line is paid out responsive to fish nibbling, a stop means for precluding reel outboard movement and line pay out beyond a predetermined limit and for effecting horizontal rotative movement of the guide and reel and rod in a plane about the axis of the reel support tube for moving the stop on the handle out of engagement with the abutment on the cap, whereby the combination handle and signal means and reel support tube are abruptly actuated upwardly from the lower set position to the upper released position.

2. In a fishing device according to claim 1, wherein the stop is adjustable relative to the handle.

3. In a fishing device according to claim 1, wherein the handle is adjustable relative to the reel support tube.

4. In a fishing device according to claim 1, including limit means on the cap for controlling the degree of engagement between the handle stop and abutment.

5. In a fishing device according to claim 1, wherein the guide is threaded for a portion of its length and unthreaded for a portion of its length.

* * * * *